US010855144B2

(12) United States Patent
Bodla et al.

(10) Patent No.: US 10,855,144 B2
(45) Date of Patent: Dec. 1, 2020

(54) ELECTRICAL WINDING TOPOLOGIES AND METHODS OF MAKING THE SAME

(71) Applicant: General Electric Company, Schenectady, NY (US)

(72) Inventors: Karthik Kumar Bodla, Watervliet, NY (US); Samir Armando Salamah, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 154 days.

(21) Appl. No.: 15/943,738

(22) Filed: Apr. 3, 2018

(65) Prior Publication Data
US 2019/0305646 A1 Oct. 3, 2019

(51) Int. Cl.
*H02K 9/20* (2006.01)
*H02K 1/20* (2006.01)
*H02K 3/24* (2006.01)
*H02K 3/12* (2006.01)
*H02K 9/00* (2006.01)
*F28D 15/04* (2006.01)

(52) U.S. Cl.
CPC ............. *H02K 9/20* (2013.01); *F28D 15/043* (2013.01); *H02K 1/20* (2013.01); *H02K 3/12* (2013.01); *H02K 3/24* (2013.01); *H02K 9/005* (2013.01); *H02K 2209/00* (2013.01)

(58) Field of Classification Search
CPC ............ H02K 9/00; H02K 9/005; H02K 9/02; H02K 9/04; H02K 9/06; H02K 9/08; H02K 9/10; H02K 9/12; H02K 9/14; H02K 9/16; H02K 9/18; H02K 9/19; H02K 9/193; H02K 9/197; H02K 9/20; H02K 9/22; H02K 9/24; H02K 9/26; H02K 9/28; H02K 3/24; H02K 1/20; H02K 5/20; H02K 3/12; H02K 2209/00; F28D 15/043
USPC ...... 310/52, 54, 55, 56, 57, 58, 59, 60 R, 61, 310/62, 63, 60 A, 64
See application file for complete search history.

(56) References Cited

U.S. PATENT DOCUMENTS

| 3,801,843 | A  | 4/1974 | Corman et al. |
| 5,140,204 | A  | 8/1992 | Cashmore et al. |
| 8,405,262 | B1 | 3/2013 | Beatty et al. |
| 9,230,726 | B1 | 1/2016 | Parker et al. |

(Continued)

FOREIGN PATENT DOCUMENTS

| BR | P10706674 A2 | 4/2011 |
| CN | 1745507 A | 3/2006 |

(Continued)

OTHER PUBLICATIONS

Klonowski Thomas; Serghine Camel, Electric Machine with Phase Change Material, Nov. 8, 2018, Safran Helicopter Engines, WO 2018202963 (English Machine Translation) (Year: 2018).*

(Continued)

*Primary Examiner* — Quyen P Leung
*Assistant Examiner* — Alexander A Singh
(74) *Attorney, Agent, or Firm* — Armstong Teasdale LLP

(57) ABSTRACT

An electrical winding topology having a core and a plurality of windings is provided. The plurality of windings is operatively coupled to the core, where at least one of the plurality of windings includes an evaporator section and a condenser section. Further, at least a portion of one or more of the plurality of windings includes heat pipes.

20 Claims, 6 Drawing Sheets

(56) References Cited

U.S. PATENT DOCUMENTS

| | | |
|---|---|---|
| 2004/0189109 A1 | 9/2004 | Holly et al. |
| 2006/0017335 A1 | 1/2006 | Matin et al. |
| 2006/0066156 A1 | 3/2006 | Dong et al. |
| 2008/0017354 A1* | 1/2008 | Neal .................. H02K 9/19 |
| | | 165/104.14 |
| 2008/0023177 A1 | 1/2008 | Hassett et al. |
| 2010/0026108 A1* | 2/2010 | Hassett ............... H02K 9/20 |
| | | 310/54 |
| 2013/0255931 A1 | 10/2013 | Arnett et al. |
| 2014/0183992 A1* | 7/2014 | Seo .................. H02K 15/0068 |
| | | 310/71 |
| 2016/0352201 A1 | 12/2016 | Ranjan et al. |

FOREIGN PATENT DOCUMENTS

| | | |
|---|---|---|
| CN | 103959606 A | 7/2014 |
| CN | 103618394 B | 8/2016 |
| FR | 2971376 A1 | 8/2012 |
| JP | S5535900 U | 3/1980 |
| JP | H08205442 A | 8/1996 |
| JP | 2010154713 A | 7/2010 |
| JP | 20130198328 A | 9/2013 |
| RU | 166812 U1 | 12/2016 |
| WO | WO-2018202963 A1 * | 11/2018 ............... H02K 3/22 |

OTHER PUBLICATIONS

Wits et al., "Thermal Management through In-Board Heat Pipes Manufactured using Printed Circuit Board Multilayer Technology", 31st International Conference on Electronics Manufacturing and Technology, http://ieeexplore.ieee.org/document/4456432/, Nov. 8-10, 2007.

Peters et al., "Design of an Integrated Loop Heat Pipe Air-Cooled Heat Exchanger for High Performance Electronics", IEEE Transactions on Components, Packaging and Manufacturing Technology, http://ieeexplore.ieee.org/abstract/document/6268333/, vol. 2, Issue 10, pp. 1637-1648, Aug. 14, 2012.

Robinson et al., "A New Hybrid Heat Sink with Impinging Microjet Arrays and Micro-channels Fabricated using High Volume Additive Manufacturing", 33rd Thermal Measurement, Modeling & Management Symposium (SEMI-THERM), http://ieeexplore.ieee.org/document/7896927/, Mar. 13-17, 2017.

Extended European Search Report, dated Aug. 14, 2019, for related EP patent application No. EP 19166415.0.

EP Office Action, dated Sep. 18, 2020, for related EP patent application No. 19166415.0 (9 pgs.).

* cited by examiner

US 10,855,144 B2

ELECTRICAL WINDING TOPOLOGIES AND METHODS OF MAKING THE SAME

BACKGROUND

Embodiments of the present specification relate to electrical winding topologies, and more particularly, embodiments of the present specification relate to electrical topologies with enhanced thermal management and methods of making such topologies.

Conventional electrical machines typically generate a significant amount of heat during routine operations. If not managed, the generated heat may accumulate, resulting in an undesirable rise in temperature in the electrical machine, and eventual damage or failure of components (such as insulation layers, wedges, magnets, or the like) of the electrical machines. For example, some estimates indicate that for every 10° C. (18° F.) rise in temperature, the life of the components may decrease by about 50%. In addition, the heat generated is waste energy, owing to inherent inefficiencies associated with converting input electrical energy to useful work. As such, managing the generated heat thus becomes imperative to ensuring the safe and reliable operation of the designed components. Moreover, such heat (thermal) management is a critical bottleneck in achieving improved power density.

Further, conventional thermal management mechanisms typically include providing one or more thermal paths configured to allow a flow of heat away from temperature sensitive components of the electrical machines. For example, in the electrical machines that utilize electrical windings having several insulation layers, heat generated in the electrical windings traverses through various components, such as a coating of varnish, a turn insulation, a slot liner, a resin or epoxy, laminations, thermal interface at lamination-housing contact, and the like, in a thermal path before ultimately being rejected to a surrounding fluid.

Heat transfer enhancement features, such as fins or turbulators, are used in the electrical machines to facilitate rejection of heat from the components, transfer of heat from the components to the surrounding fluid, or both. When properly designed, these heat transfer enhancement features enhance the effective surface area available for convection and are capable of complementing other heat transfer mechanisms that may be employed by the electrical machines for the purpose of thermal management.

BRIEF DESCRIPTION

In one embodiment, an electrical winding topology having a core and a plurality of windings is provided. The plurality of windings is operatively coupled to the core, where at least one of the plurality of windings includes an evaporator section and a condenser section. Further, at least a portion of one or more of the plurality of windings includes heat pipes.

In another embodiment, a thermal management system having an electrical winding topology is provided. The electrical winding topology includes a core and a plurality of windings. The plurality of windings is operatively coupled to the core, where at least one of the plurality of windings includes an evaporator section and a condenser section. Further, at least a portion of one or more of the plurality of windings includes heat pipes. The thermal management system also includes an external cooling arrangement operatively coupled to one or more of the plurality of windings to transfer heat away from the one or more of the plurality of windings.

In yet another embodiment, an electrical winding topology having a core and a plurality of windings is provided. The plurality of windings is operatively coupled to the core, where at least one of the plurality of windings includes an evaporator section and a condenser section. Further, one or more of the plurality of windings include a composite structure having heat pipes and electrically conductive connecting elements.

DRAWINGS

These and other features and aspects of embodiments of the invention will become better understood when the following detailed description is read with reference to the accompanying drawings in which like characters represent like parts throughout the drawings, wherein.

DETAILED DESCRIPTION

Embodiments of the present specification relate to cooling and thermal management, and more particularly to an electrical winding topology and a thermal management system employing the electrical winding topology of the present specification.

Figure 1:
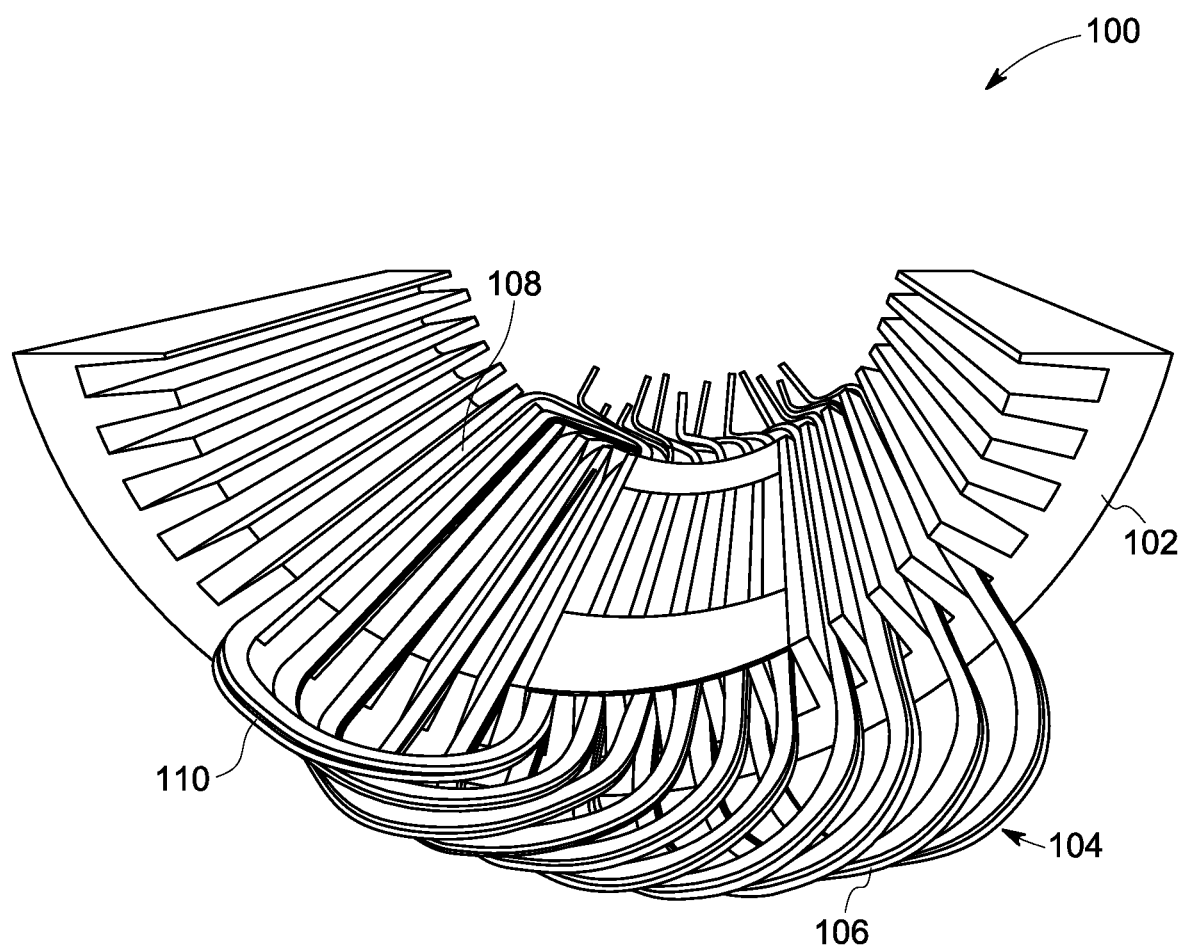
FIG. 1 is a diagrammatical illustration of an example electrical winding topology, in accordance with aspects of the present specification.

FIG. 1 illustrates an electrical winding topology 100. The electrical winding topology 100 includes a core 102 and a plurality of windings generally referenced by reference numeral 104. The plurality of windings 104 is at least partly disposed in the core 102. Further, one or more of the windings 104 form a closed loop structure. Each closed loop structure is referred to as a single winding.

In certain embodiments, at least a portion of a winding 104 may include a heat pipe 106. In some embodiments, as described with reference to FIGS. 2A-2B, one or more of the plurality of windings 104 include heat pipes, such as heat pipes 106. In same or different embodiments, as described with reference to FIG. 3, one or more of the plurality of windings 104 include a composite structure having one or more heat pipes and one or more connecting elements. The connecting elements are electrically and thermally conductive structures that together with corresponding heat pipes form closed loop structures of the windings 104. The connecting elements may be solid or hollow structures that in conjunction with the heat pipes enable thermal and electrical functionality of the windings. Non-limiting examples of a connecting element include a hollow tube or a solid tube. In some embodiments where one or more of the plurality of windings include the composite structure, a portion of the closed loop structure of a single winding may include a heat pipe and another portion of the closed loop structure may include a thermally and electrically conductive connecting element.

In certain embodiments, the windings 104 may include a distributed winding arrangement or a concentrated winding arrangement. The plurality of windings 104 forms a continuous structure and outer walls of the heat pipes 106 and/or connecting elements provide a resistance-free electrical current path for the electrical current to flow. The windings 104 of the electrical winding topology 100 include electrical contacts that electrically connect the windings 104 to an electrical source or an electrical component.

Each heat pipe 106, in general, includes an evaporator section 108 and a condenser section 110. In some embodiments where the windings 104 include heat pipes 106, the evaporator section 108 of the at least one of the plurality of windings 104 is disposed in the core 102. Further, in these embodiments, the condenser section 110 of the at least one of the plurality of windings is disposed outside the core 102. Although not illustrated, in alternative embodiments, the evaporator section 108 of the windings 104 is disposed outside the core 102, and the condenser section 110 of the windings 104 is disposed in the core 102. In these embodiments, the core 102 may be cooler than immediate surroundings of the core 102, where the evaporator section 108 is disposed. In some of these embodiments, the core 102 may be cooled via cooling ducts present in the core 102, or cooling ducts present near the windings 104, or a cooling jacket operatively coupled to the core 102.

In certain embodiments, the core 102 is a stator core or a rotor core. In embodiments where the plurality of windings 104 includes a composite structure having heat pipes and electrically conductive connecting elements, the heat pipes may be disposed in the core 102 and the electrically conductive connecting element may be disposed outside the core 102, or vice versa.

Figure 2A:
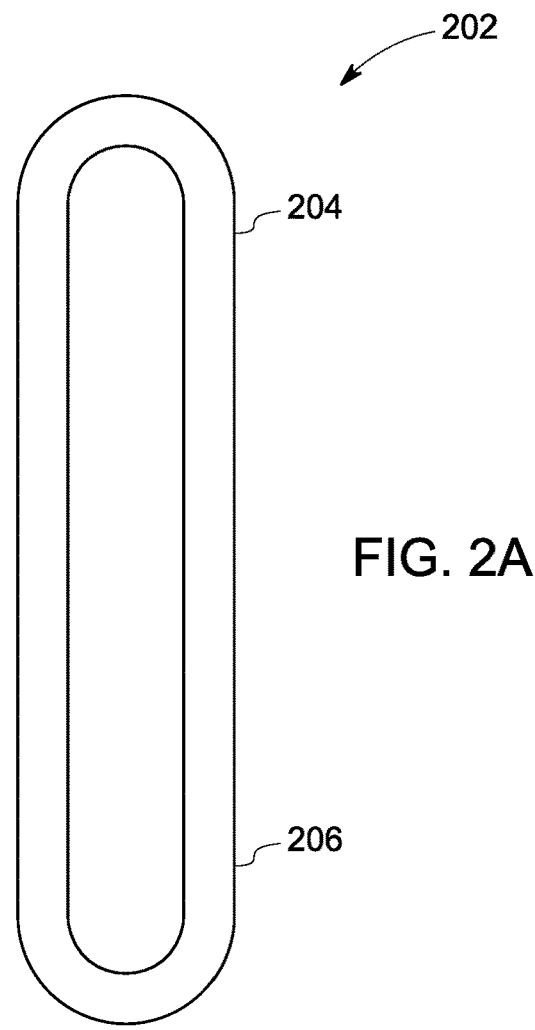
FIGS. 2A-2B are diagrammatical representations of an example winding having a heat pipe, in accordance with aspects of the present specification.
Figure 2B:
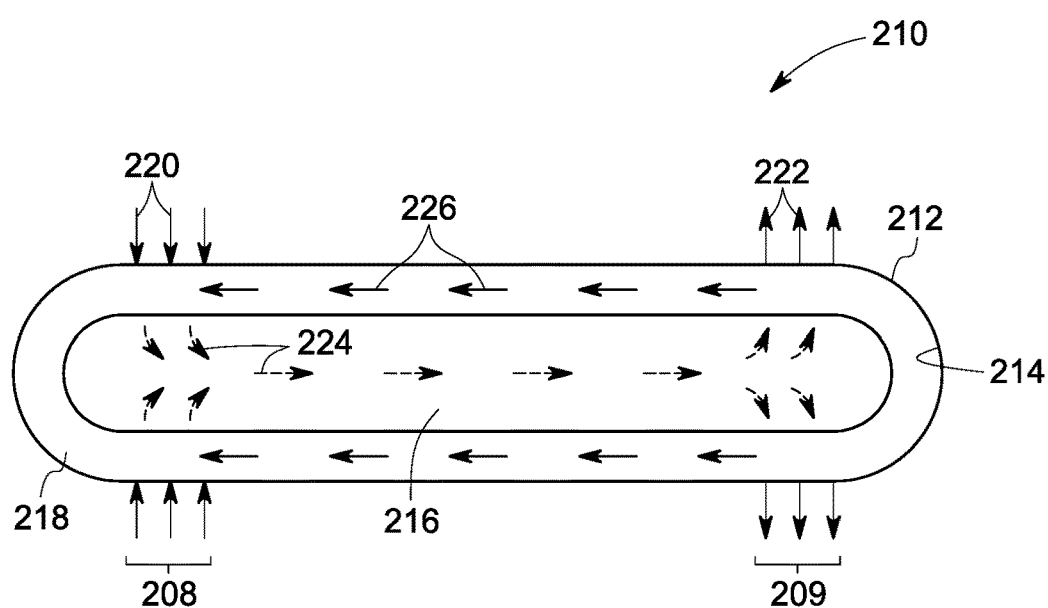

FIGS. 2A-2B illustrate an example winding 202 of an electrical winding topology of an electrical motor (not illustrated in FIGS. 2A-2B). In the illustrated embodiments of FIGS. 2A-2B, the winding 202 includes a heat pipe 204 such that a closed loop structure 206 of the winding 202 is made of the heat pipe 206. FIG. 2A illustrates the closed loop structure 206 formed by the heat pipe 204, and FIG. 2B illustrates a cross-sectional view 210 of the heat pipe 204. The heat pipe 204 includes an outer wall 212 and a wick structure 218 disposed along an inner surface 214 of the outer wall 212. The heat pipe 204 is configured to house a coolant fluid 216 disposed within the wick structure 218. The wick structure 218 disposed along the inner surface 214 of the heat pipe 204 facilitates capillary action of the coolant fluid 216. In addition, in embodiments where there is rotation or revolution movement of the core 202 involved in the operation of the electrical motor, the coolant fluid 216 may flow using centrifugal forces. In some embodiments, centrifugal force may act as a primary force over the capillary action.

The winding 202 is a closed loop structure that is sealed. The wick structure 218 is typically disposed between the coolant fluid 216 and the inner surface 214. In some embodiments, owing to their high thermal conductivity, copper or aluminum may be used to form the outer wall 212 of the heat pipe 204. In same or alternative embodiments, water may be used as the coolant fluid 216 due to its suitable thermal characteristics. However, it may be noted that other choices are also common, depending on the amount of heat that is to be transported and operating conditions that are predicted to be present in the winding 202 during operation. Arrows 220 represent a direction of heat input in the heat pipe 204, and arrows 222 represent heat output from the heat pipe 204. Portion of the heat pipe 204 where the heat enters is the evaporator section 208 and the opposite section is the condenser section 209.

During operation of the electrical winding topology, as the heat pipe 204 absorbs surrounding heat, the coolant fluid 216, which is a volatile fluid, experiences a liquid to vapor phase transition using phase change heat transfer at operating conditions of the electrical winding topology. By way of example, the coolant fluid 216 transitions from a liquid phase to a vapor phase at operating temperatures and pressures present in the electrical winding during the operation. In certain embodiments, during rotation of the rotor of the electrical motor, when the coolant fluid 216 is present in a liquid phase, the liquid phase coolant fluid experiences a centrifugal force against the outer wall 212 of a portion of the heat pipe 204. Further, remaining portion of the heat pipe 204 may be occupied by essentially saturated vapor that is in equilibrium with the liquid phase of the coolant fluid. Heat is conducted through the outer wall 212 of the evaporator section 208 and is transferred to the liquid phase of the coolant fluid 216 present in the condenser section 209. Addition of heat in the evaporator section 208 causes evaporation or boiling of the volatile coolant fluid which generates a vapor which flows at a high speed to the condenser section 209 of the heat pipe 204. Flow of the vapors from the evaporator section 208 to the condenser section 209 is illustrated by arrows 224.

Upon condensation, the latent heat of the vapors of the coolant fluid 216 is transported by conduction through the wick structure 218 and a coolant fluid film, and subsequently via conduction through the outer walls 212 of the heat pipe 204. The condensed coolant fluid 216 present in the condenser section 209 then returns to the evaporator section 208, for example, by capillary action of the wick structure 218, along an inner surface 214 of the heat pipe 204. Specifically, the condensed coolant fluid 216 returns to the evaporator section 208 of the heat pipe 204 to replace the coolant fluid 216 which is evaporated from the evaporator section 208, thus maintaining a constant liquid fraction and gas pressure at any steady state operating condition in the evaporator section 208 and the heat pipe 204, in general. Movement of the coolant fluid 216 from the condenser section 209 to the evaporator section 208 is represented by arrows 226. As the coolant fluid 216 travels toward the evaporator section 208, whether by capillary action or centrifugal forces, or both, the coolant fluid 216 may form a thin film, referred to as the coolant fluid film, along the inner surface 214 of the heat pipe 204. In certain embodiments, the condenser section 209 of the heat pipe 204 may be cooled by external cooling arrangements, such as a heat sink, or any other cooling medium.

In certain embodiments, in addition to transporting heat, the outer walls 212 of the heat pipe 204 are configured to conduct electrical current during operation, thereby serving the dual purpose of conduction of electrical current and dissipation of heat. The winding 202 is formed from the heat pipe 204 such that the wick structure 218 forms a continuous structure within the winding 202. Bends of the closed loop structure 206 are defined such that the wick structure 218 can conform with the bends with minimal or no disintegration to prevent adverse effect on heat transport during operation of the electrical motor.

Figure 3:
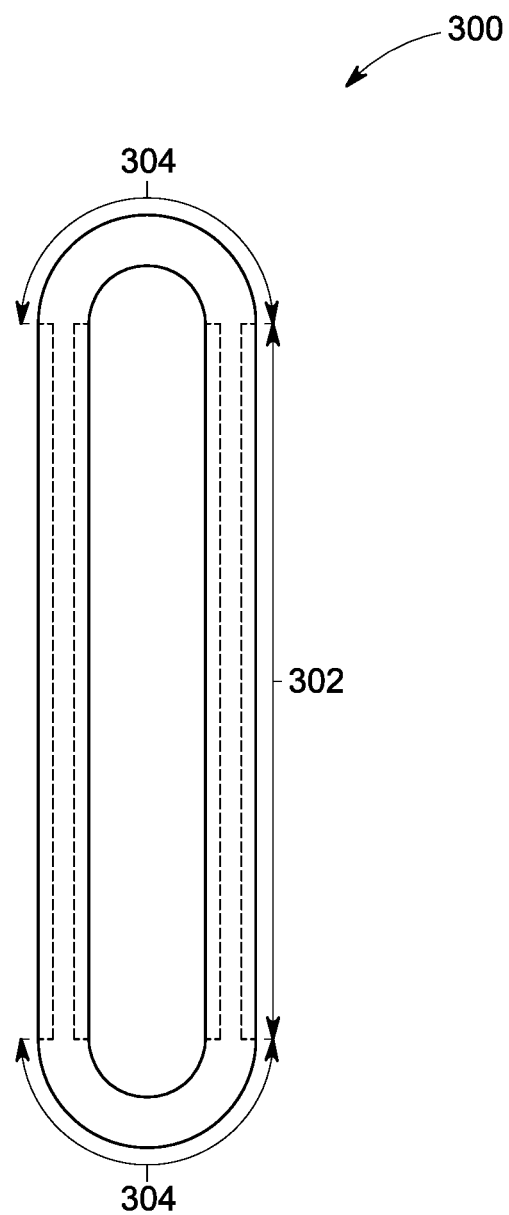
FIG. 3 is a diagrammatical representation of another example winding having a composite structure formed of heat pipes and connecting elements, in accordance with aspects of the present specification.

FIG. 3 illustrates a winding 300 having a composite structure, where the composite structure includes portions containing heat pipes 302 and connecting portions having electrically and thermally conductive connecting elements 304. Although in the presently contemplated embodiment, the heat pipes 302 form a linear section of the winding 300 and the connecting elements 304 form a curved section of the winding 300, it may be noted that other configurations, such as the heat pipes 302 forming the curved sections and/or connecting elements 304 forming the linear sections, or heat pipes 302 and connecting elements 304 forming portions of the curved and/or linear sections, are also envisioned within the purview of the present specification.

The cross-sectional area of the connecting elements 304 may be similar to that of the heat pipes 302. The connecting elements 304 are electrically and thermally conductive structures. Further, the connecting elements 304 may be solid or hollow structures. Also, the connecting elements 304 may be made of copper, aluminum, or other similar materials that have a thermal as well as electrical conductivity similar to the material of outer walls of the heat pipe 302. Further, the heat pipes 302 and the connecting elements 304 may be joined using an electrically conductive solder that is able to maintain a solid state at operating temperatures of the winding 300. The electrically conductive solders may include solders with melting temperatures above 200° C. Non-limiting examples of such electrically conductive solders include solders suitable for use in electrical motors and generators, such as $Sn_{95}Sb_5$, $Pb_{95}Sn_3Ag_2$, $Cd_{82}Zn_{16}Ag_2$, $Cd_{73}Zn_{22}Ag_5$, and $Cd_{95}Ag_5$.

Figure 4A:
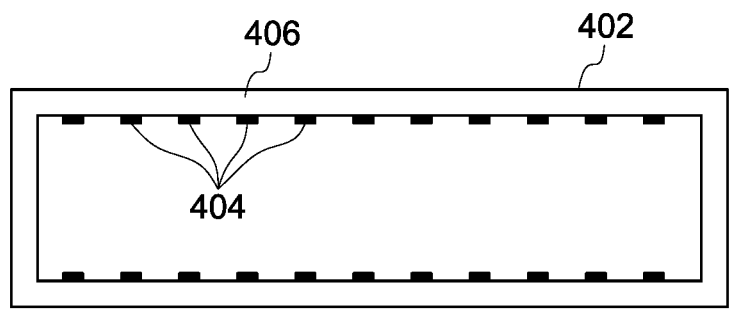
FIG. 4A-4D are cross-sectional views of portions of windings having turbulators, in accordance with aspects of the present specification.
Figure 4B:
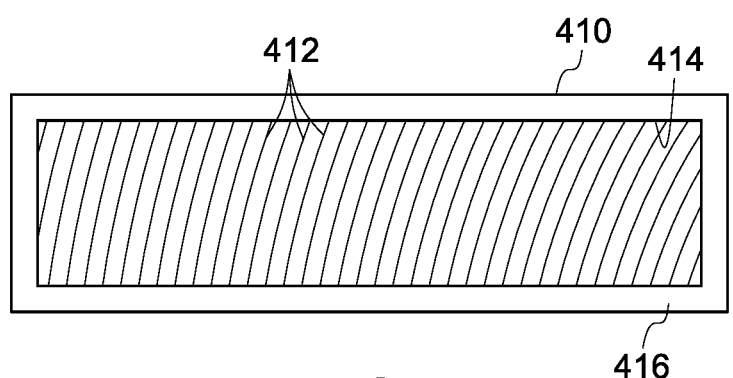

In certain embodiments, one or more of the plurality of windings may include one or more local heat transfer enhancement features. The local heat transfer enhancement features are configured to enhance heat transfer efficiency of corresponding windings. The local heat transfer enhancement features may be present on inner surfaces of heat pipes, connecting elements, or on a rib or beam that runs along a certain external portion of a winding. The local heat transfer enhancement features enhance heat transfer within the winding. By way of example, the local heat transfer enhancement features facilitate mixing and directing coolant fluid disposed in the winding. In certain embodiments, the local heat transfer enhancement features include turbulators. The turbulators are configured to cause disruption in flow of the coolant fluid present in the winding. In some examples, the turbulators are disposed in the evaporator and/or condenser sections of the one or more windings. Non-limiting examples of the turbulators may include indentations, protrusions, ribs, channels, discontinuities, or combinations thereof. FIGS. 4A-4B illustrate different examples of turbulators that may be employed in windings.

FIG. 4A illustrates a portion of an example winding 402 of the present specification, where the winding 402 includes protrusions 404 disposed along an outer wall 406 of the winding 402. The winding 402 may include a heat pipe or a composite structure made of a heat pipe and a connecting element.

FIG. 4B illustrates a portion of an example winding 410 of the present specification, where the winding 410 includes ribs 412 formed on an inner surface 414 of an outer wall 416 of the winding 410. The winding 410 may include a heat pipe, or a composite structure made of a heat pipe and a connecting element.

Figure 4C:
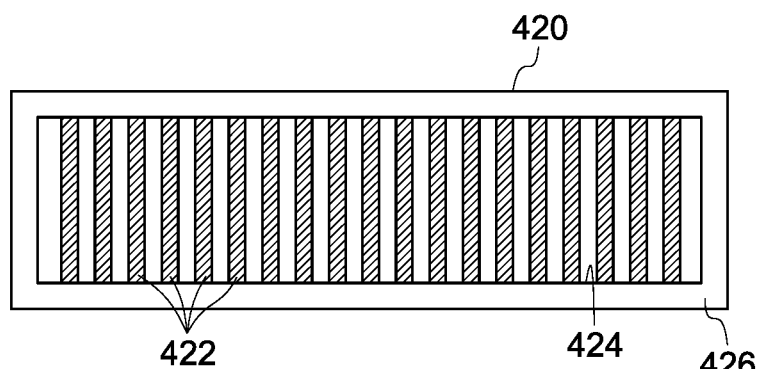

FIG. 4C illustrates a portion of an example winding 420 of the present specification, where the winding 420 includes channels or struts 422 formed on an inner surface 424 of an outer wall 426 of the winding 420. The winding 420 may include a heat pipe or a composite structure made of a heat pipe and a connecting element.

Figure 4D:
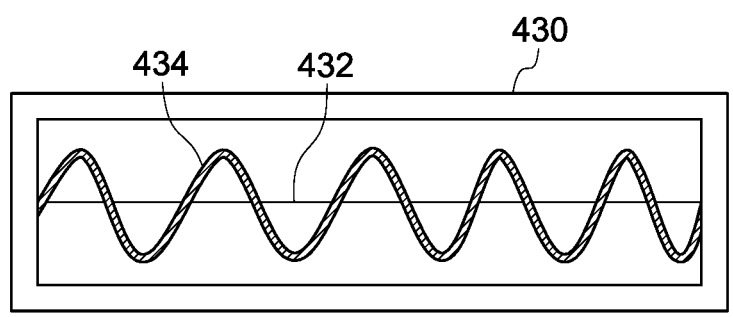

FIG. 4D illustrates a portion of an example winding 430 of the present specification, where the winding 430 includes a beam or pole 432 having a spiral blade 434 twisted around the pole 432. The winding 430 may include a heat pipe or a composite structure made of a heat pipe and a connecting element.

Figure 5:
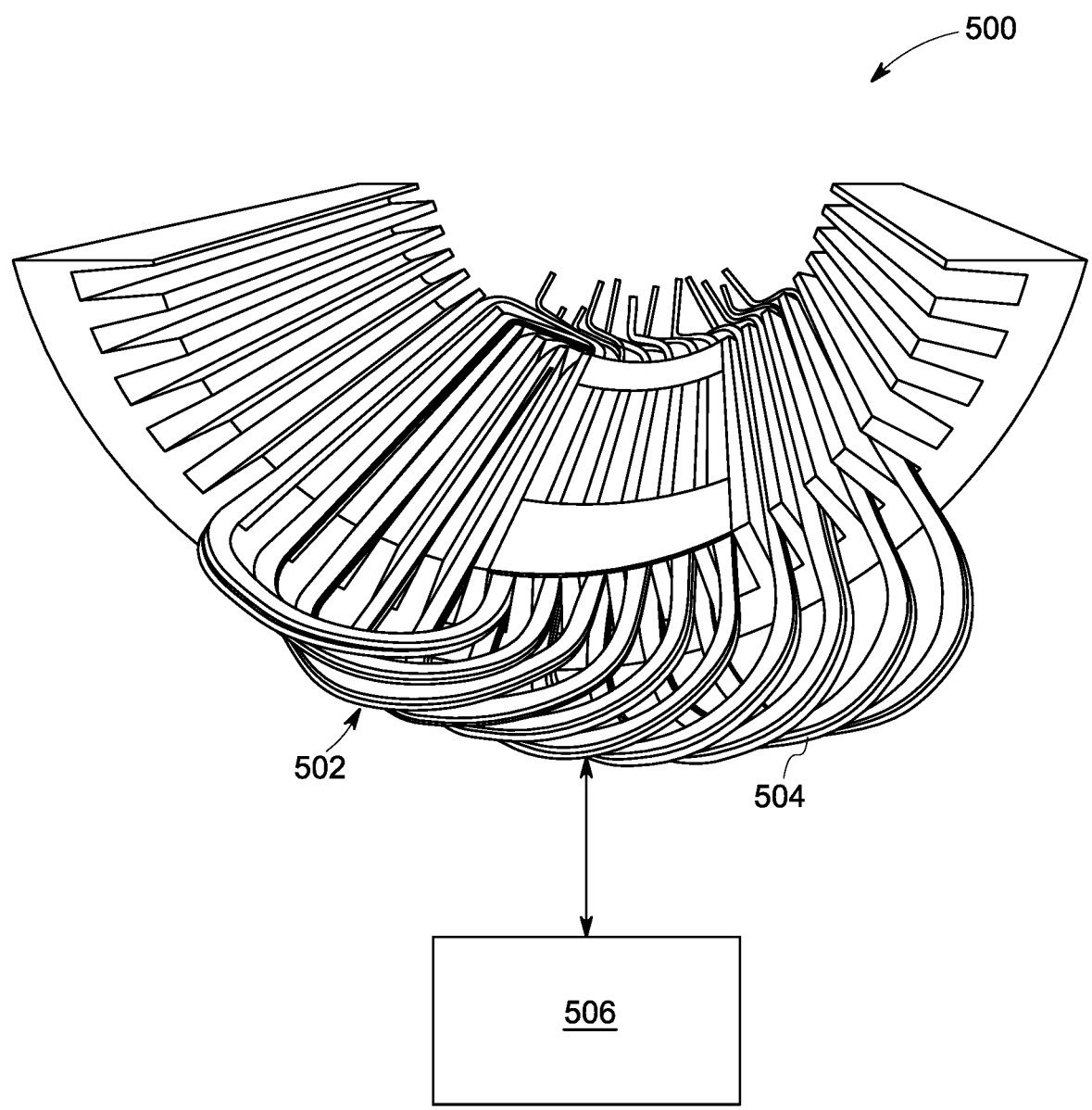
FIG. 5 is a diagrammatical representation of an example thermal management system having an electrical winding topology, in accordance with aspects of the present specification.

FIG. 5 illustrates a thermal management system 500 having an electrical winding topology 502, such that one or more of a plurality of windings 504 are configured to be coupled to an external cooling arrangement, represented generally by block 506. The external cooling arrangement 506 is configured to provide at least localized cooling to the windings 504 with minimal to no disruption to the flow of electrical current during operation of the electrical winding topology 502.

The external cooling arrangement 506 is external to the electrical winding topology 502. Further, the external cooling arrangement 506 may include a heat sink, a cooling jacket, or a cooling medium. In some embodiments, condenser sections of the windings 504 are operatively coupled to the external cooling arrangement 506. By way of example, the heat sink may be operatively coupled to the condenser sections of the windings 504 to extract heat and provide cooling to the condenser sections of the windings 504. The heat sink may include one or more fins, wings, winglets, flaps, stubs, plates, rods, or combinations thereof.

In embodiments where the windings 504 include the heat pipes, when vapors of a coolant fluid condense, heat released due to condensation is passed to outer walls of the heat pipes and subsequently to the external cooling arrangement 506. In embodiments where the windings 504 include a composite structure, the heat of the coolant fluid present in the winding 504 is transferred from the coolant fluid to the outer walls of the heat pipes or connecting elements and subsequently to the external cooling arrangement 506.

In some embodiments, a cooling medium used as the external cooling arrangement 506 may include non-volatile or volatile coolant liquid. The coolant liquid may be sprayed on at least portions of one or more of the windings 504. The coolant liquid may be sprayed from stationary or rotary nozzles or by the flow of air or other gases.

Figure 6:
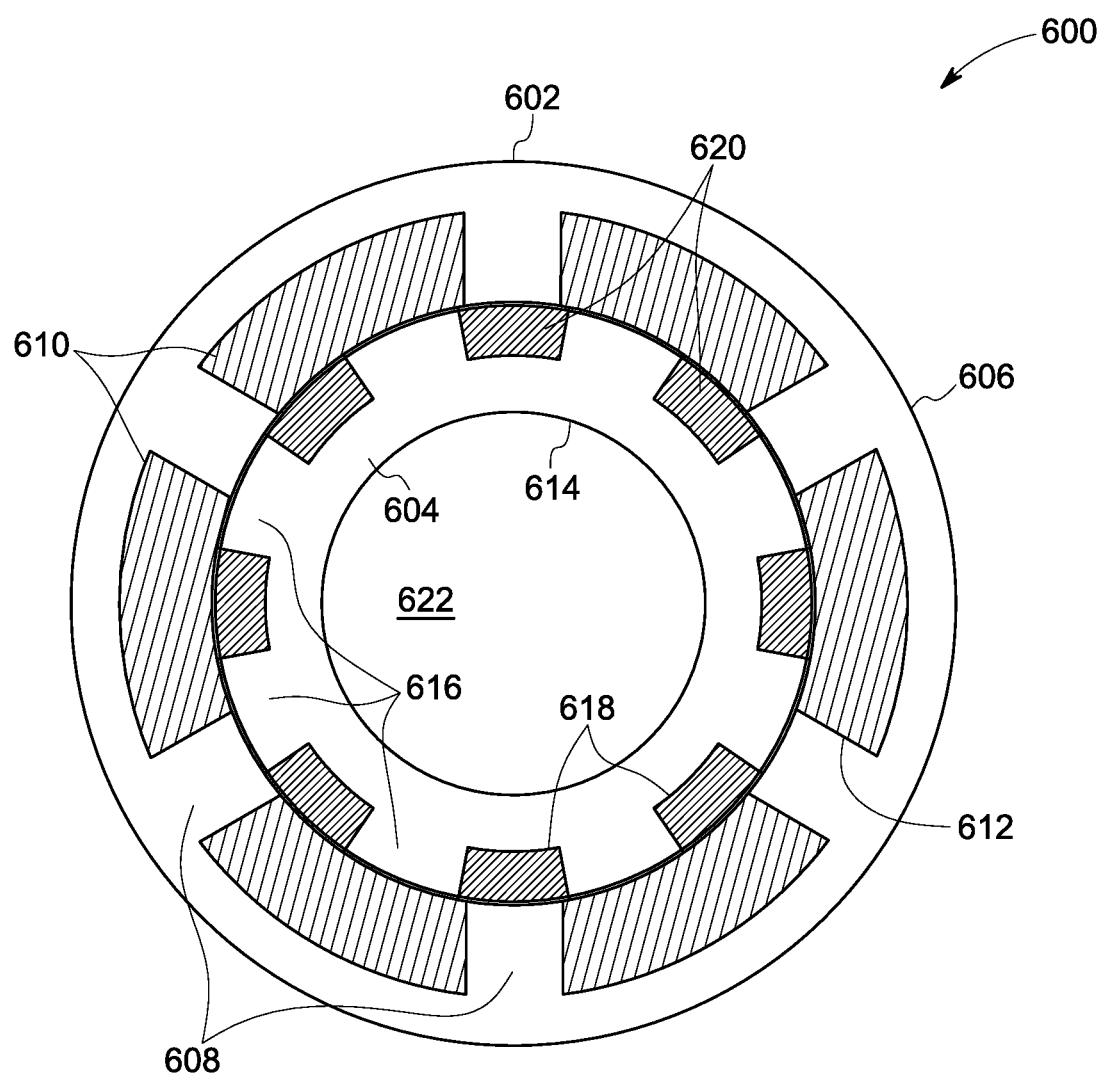
FIG. 6 is a cross-sectional view of an electrical motor, in accordance with aspects of the present specification.

FIG. 6 illustrates a cross-sectional view of an electrical motor 600, in accordance with one exemplary embodiment of the present specification. In the illustrated embodiment, the electrical motor 600 is a radial flux electrical machine. The electrical motor 600 includes a stator 602 and a rotor 604 disposed concentric to the stator 602 such that a thin air gap (not shown in FIG. 6) is established between the stator 602 and the rotor 604. In the illustrated embodiment, the rotor 604 rotates relative to the stator 602. In some embodiments, the electrical motor 600 may be a motor, where the rotor 604 moves relative to the stator 602 to convert electrical energy to mechanical energy. Alternatively, in some other embodiments, the electrical motor 600 may be an electrical generator, where the motion of the rotor 604 relative to the stator 602 converts mechanical energy to electrical energy. In some embodiments, the rotor 604 is disposed within a stator 602. In some other embodiments, the stator 602 is disposed within a rotor 604.

The stator 602 includes a stator core 606. In one or more embodiments, the stator core 606 includes stator teeth 608 defining a plurality of stator slots 610. Each stator slot of the plurality of stator slots 610 is defined between a corresponding pair of adjacent stator teeth 608. The rotor 604 includes a rotor core 614. In one or more embodiments, the rotor core 614 includes rotor teeth 616 defining a plurality of rotor slots 618. Each rotor slot 618 of the plurality of rotor slots 618 is defined between a corresponding pair of adjacent rotor teeth 616. The rotor 604 further includes a permanent magnet 620 disposed at least in one rotor slot 618. In one or more embodiments, the rotor 604 is mounted on a shaft 622 and is configured to be driven by the rotor 604.

The electrical motor 600 further includes a plurality of windings 612 operatively coupled to one of the stator core 606 or the rotor core 614. In the illustrated embodiment, the windings 612 are shown to be disposed in the stator core 606. Although not illustrated, alternatively, the windings 612 may be disposed in the rotor core 614. As illustrated, the windings 612 are disposed at least in one stator slot 610 of the stator core 606. Further, at least one of the plurality of windings includes an evaporator section (not shown in FIG. 6) and a condenser section (not shown in FIG. 6). Further, in embodiments where the windings are disposed in the stator core 606, the evaporator section of the at least one of the plurality of windings 612 is disposed in the stator core 606, and the condenser section of the at least one of the windings 612 is disposed outside the stator core 606. In embodiments of the present specification, at least a portion of one or more of the plurality of windings 612 includes heat pipes. Further, one or more of the windings 612 form a closed loop. In certain embodiments, a phase-separator (not shown in FIG. 6) may be used to electrically insulate at least two of the windings 612 disposed in the same slot, such as the slot 610.

The electrical motor 600 may be coupled to an external cooling arrangement (not shown in FIG. 6). By way of example, one or more windings 612 are operatively coupled to the external cooling arrangement.

Advantageously, use of heat pipes in the windings of an electrical winding topology enhances both thermal and electrical performances of the electrical motor that employs such windings. By way of example, due to the phase-change that takes place within the heat pipe, the heat pipes may demonstrate 10X to 100X enhanced thermal conductivity relative to pure copper. With such enhanced axial thermal conduction, the heat generated may be effectively pulled out of a stack of windings, independent of the stack length. Further, using the windings to perform the dual role of electrical as well as thermal conduction minimizes design complications. Further, use of heat pipes in the windings render these windings a self-regulating device, and obviates the need for a separate arrangement for thermal conduction. Additionally, use of the heat pipes enables the windings to handle excess heat without changing coolant conditions for thermal management.

While only certain features of the invention have been illustrated and described herein, many modifications and changes will occur to those skilled in the art. It is, therefore, to be understood that the appended claims are intended to cover all such modifications and changes as fall within the scope of the invention.

The invention claimed is:

1. An electrical winding topology, comprising:
   a core; and
   a plurality of windings operatively coupled to the core, wherein at least one winding of the plurality of windings comprises an evaporator section and a condenser section, and wherein at least a portion of one or more windings of the plurality of windings comprises a composite closed loop structure comprising:
   a first heat pipe comprising a first end and a second end;
   a second heat pipe comprising a first end and a second end;
   a first thermally conductive connecting element electrically connected to and coupled between the first heat pipe first end and the second heat pipe first end, wherein the first and second heat pipes do not extend through the first thermally conductive connecting element; and
   a second thermally conductive connecting element electrically connected to and coupled between the first heat pipe second end and the second heat pipe second end, wherein the first and second heat pipes do not extend through the second thermally conductive connecting element.

2. The electrical winding topology of claim 1, wherein the plurality of windings form closed loop structures.

3. The electrical winding topology of claim 1, wherein the evaporator section of the at least one winding is disposed in the core, and wherein the condenser section of the at least one winding is disposed outside the core, or vice versa.

4. The electrical winding topology of claim 1, wherein the one or more windings comprise one or more local heat transfer enhancement features operatively coupled to the one or more windings, and wherein the local heat transfer enhancement features are configured to enhance heat transfer efficiency of the one or more windings.

5. The electrical winding topology of claim 4, wherein the local heat transfer enhancement features comprise turbulators, and wherein the turbulators are disposed in the evaporator section, the condenser section, or both, of the one or more of the plurality of windings.

6. The electrical winding topology of claim 5, wherein the turbulators comprise indentations, protrusions, ribs, channels, discontinuities, or combinations thereof.

7. The electrical winding topology of claim 1, wherein the one or more windings are configured to be coupled to an external cooling arrangement, and wherein the external cooling arrangement comprises a heat sink, a cooling medium, a cooling jacket, or combinations thereof.

8. The electrical winding topology of claim 7, wherein the heat sink comprises one or more fins, wings, winglets, flaps, stubs, plates, rods, or combinations thereof.

9. The electrical winding topology of claim 1, wherein the core is a stator core or a rotor core.

10. A thermal management system, comprising:
    an electrical winding topology, comprising
    a core;
    a plurality of windings operatively coupled to the core, wherein at least one winding of the plurality of windings comprises an evaporator section and a condenser section, and wherein at least a portion of one or more windings of the plurality of windings comprises a composite closed loop structure comprising:
    a first heat pipe comprising a first end and a second end;
    a second heat pipe comprising a first end and a second end;
    a first thermally conductive connecting element electrically connected to and coupled between the first heat pipe first end and the second heat pipe first end, wherein the first and second heat pipes do not extend through the first thermally conductive connecting element; and
    a second thermally conductive connecting element electrically connected to and coupled between the first heat pipe second end and the second heat pipe second end, wherein the first and second heat pipes do not extend through the second thermally conductive connecting element; and an external cooling arrangement operatively coupled to the one or more windings to transfer heat away from the one or more windings.

11. The thermal management system of claim 10, wherein the evaporator section of the at least one winding is disposed in the core, and wherein the condenser section of the at least one winding is disposed outside the core.

12. The thermal management system of claim 10, wherein the one or more windings are configured to be coupled to an electrical component.

13. The thermal management system of claim 12, wherein condenser sections of the one or more windings are operatively coupled to the external cooling arrangement.

14. The thermal management system of claim 12, wherein the external cooling arrangement comprises a heat sink, and wherein the heat sink comprises one or more fins, wings, winglets, flaps, stubs, plates, rods, or combinations thereof.

15. The thermal management system of claim 12, wherein the core is a stator core or a rotor core.

16. The thermal management system of claim 10, wherein the heat pipes form linear sections of the one or more windings, and wherein the thermally conductive connecting elements form curved sections of the one or more windings.

17. An electrical winding topology, comprising:
a core; and
a plurality of windings operatively coupled to the core, wherein at least one winding of the plurality of windings comprises an evaporator section and a condenser section, and wherein one or more windings of the plurality of windings comprise a composite closed loop structure comprising:
  a first heat pipe comprising a first end and a second end;
  a second heat pipe comprising a first end and a second end;
  a first thermally conductive connecting element electrically connected to and coupled between the first heat pipe first end and the second heat pipe first end, wherein the first and second heat pipes do not extend through the first thermally conductive connecting element; and
  a second thermally conductive connecting element electrically connected to and coupled between the first heat pipe second end and the second heat pipe second end, wherein the first and second heat pipes do not extend through the second thermally conductive connecting element.

18. The electrical winding topology of claim 17, wherein the heat pipes form linear sections of the one or more windings, and wherein the thermally conductive connecting elements form curved sections of the one or more windings.

19. The electrical winding topology of claim 17, wherein the heat pipes and the thermally conductive connecting elements of the one or more windings are electrically connected using an electrically conductive solder.

20. The electrical winding topology of claim 17, wherein the heat pipes form curved sections of the one or more windings, and wherein the thermally conductive connecting elements form linear sections of the one or more windings.

* * * * *